US012602887B2

(12) United States Patent (10) Patent No.: US 12,602,887 B2
Lurie et al. (45) Date of Patent: Apr. 14, 2026

(54) AUGMENTED REALITY CONTROL SURFACE

(71) Applicant: Avid Technology, Inc., Burlington, MA (US)

(72) Inventors: William Lurie, Alamo, CA (US); Steven H. Milne, Palo Alto, CA (US); Edward Jones, Boulder Creek, CA (US); Richard Nevens, San Jose, CA (US)

(73) Assignee: Avid Technology, Inc.

( * ) Notice: Subject to any disclaimer, the term of this patent is extended or adjusted under 35 U.S.C. 154(b) by 201 days.

(21) Appl. No.: 18/679,748

(22) Filed: May 31, 2024

(65) Prior Publication Data

US 2025/0371814 A1 Dec. 4, 2025

(51) Int. Cl.
*G06T 19/00* (2011.01)
*G02B 27/01* (2006.01)

(52) U.S. Cl.
CPC ........ *G06T 19/006* (2013.01); *G02B 27/0172* (2013.01); *G02B 2027/0178* (2013.01)

(58) Field of Classification Search
CPC .............. G06T 19/006; G02B 27/0172; G02B 2027/0178
See application file for complete search history.

(56) References Cited

U.S. PATENT DOCUMENTS

| | | | |
|---|---|---|---|
| 10,466,960 B2 | 11/2019 | Milne et al. | |
| 10,732,721 B1 * | 8/2020 | Clements | B66B 1/468 |
| 2017/0330381 A1 * | 11/2017 | Wright | G06F 3/017 |
| 2017/0344124 A1 * | 11/2017 | Douxchamps | G06F 3/04847 |
| 2021/0150817 A1 * | 5/2021 | Jun | G02B 27/0179 |
| 2022/0343788 A1 * | 10/2022 | Sivaratri | G06F 3/013 |
| 2024/0402983 A1 * | 12/2024 | Morsy | G06F 3/04847 |

* cited by examiner

*Primary Examiner* — Maurice L. Mcdowell, Jr.
(74) *Attorney, Agent, or Firm* — Oliver Strimpel

(57) ABSTRACT

An augmented reality overlay of a physical control surface is displayed on augmented reality glasses worn by an operator of the control surface. The overlay appears to be part of the control surface by simulating a virtual silk-screen or floats over the surface. The overlay serves a variety of functions that assist the operator to mix multiple channels of audio or other aspects of a media project. The overlay may label controls of the control surface, display text or graphics to direct the operator to specific controls and may be dynamically updated based on the current editing context, either in response to an operator prompt or automatically. A 3D model of the control surface is used by the augmented reality system to register the overlay with respect to the control surface and to simulate occlusion of portions of the overlay by components of the control surface and the operator's hands.

22 Claims, 4 Drawing Sheets

AUGMENTED REALITY CONTROL SURFACE

BACKGROUND

Many control surfaces, especially those used in professional audio production, are equipped with a large number of controls that can span a surface as large as 10 feet across. Even with an expansive panoply of controls, it is still often necessary to assign multiple functions to certain controls, the particular function assigned depending on the editing context. In order to assist operators in locating the controls they seek, control surfaces are typically built with indicators or labels that are permanently marked on the control surface and its control elements, such as faders, buttons, and knobs. When a control can have multiple functions, a dynamic means of identification is provided, usually by using small displays and LEDs. However, such approaches still require the designer of the control surface to make certain assumptions about the way controls will be grouped or which controls require dynamic as opposed to static identification. Furthermore, even when identified dynamically, the identification displays and LEDs can still be hard to locate and focus on within a sea of controls.

There is therefore a need for improved methods and systems for identifying the controls of control surfaces and for drawing the attention of control surface operators to the controls they need in a timely fashion.

SUMMARY

In general, augmented reality overlays displayed on augmented reality (AR) glasses worn by an operator of a control surface assist the operator in identifying specific controls on the control surface by highlighting portions of the control surface relevant to the current media editing context. The AR system may use a 3D model of the control surface to register the overlay with the control surface and to incorporate appropriate occlusions of portions of the overlay.

In general, in one aspect, a method of assisting an operator of a physical audio control surface comprises: providing augment reality (AR) glasses for the operator, wherein the AR glasses are in data communication with the physical audio control surface via an AR control system; providing a 3D model of the physical audio control surface, wherein the 3D model is stored in persistent storage of at least one of the physical audio control surface, the AR control system, and the AR glasses; enabling the operator to use physical controls of the physical audio control surface to mix a plurality of audio channels of a media project; and displaying on the AR glasses an overlay, wherein the overlay: is generated by at least one of the AR control system and the AR glasses using the 3D model to register a position of the overlay with respect to the physical control surface; and references one or more physical controls of the physical control surface.

Various embodiments include one or more of the following features. The overlay appears to be located on a surface of the physical audio control surface. At least part of the overlay appears to be printed onto the surface of the physical audio control surface. At least part of the overlay appears to float above a surface of the physical audio control surface. The overlay corresponds to functions assigned to the physical controls of the physical audio control surface, the functions being determined by a current phase of an audio mixing workflow of the media project. The overlay includes instructional text that pertains to one or more of the referenced one or more physical controls of the AR control surface. The overlay is dynamically updated based at least in part on a position of the AR glasses with respect to the physical audio control surface. The overlay is updated in real time to reflect an adjustment of a position of the referenced one or more physical controls. The overlay is updated in real time to simulate occlusion of a portion of the overlay by one or more physical components of the physical audio control surface. The physical component is a protruding knob and the occluded portion of the overlay includes a position indicator of the knob. The physical component is a fader cap and the occluded portion of the overlay includes a switch label. The physical component is a display of the physical audio control surface. The overlay is adjusted in real time to simulate occlusion of a portion of the overlay by a hand of the operator. Providing at least one of a hand and finger position sensor; using the at least one of the hand and finger position sensor to detect a gesture made by the operator; and wherein the AR overlay is determined in part by the gesture made by the operator. The overlay is generated in response to a prompt by the operator. The overlay is generated in response to operation of a control of the physical audio control surface. The overlay is determined in part by a current editing context of the media project. The editing context is determined by a media processing application controlled by the physical audio control surface. The editing context is determined by the physical audio control surface. The editing context corresponds to a phase of a multi-phase audio mixing workflow for the media project.

In general, in another aspect, a computer program product comprises: a non-transitory computer-readable medium with computer-readable instructions encoded thereon, wherein the computer-readable instructions, when processed by a processing device instruct the processing device to perform a method of assisting an operator of a physical audio control surface, the method comprising: providing augmented reality (AR) glasses for the operator, wherein the AR glasses are in data communication with the physical audio control surface via an AR control system; providing a 3D model of the physical audio control surface, wherein the 3D model is stored in persistent storage of at least one of the physical audio control surface, the AR control system, and the AR glasses; enabling the operator to use physical controls of the physical audio control surface to mix a plurality of audio channels of a media project; and displaying on the AR glasses an overlay, wherein the overlay: is generated by at least one of the AR control system and the AR glasses using the 3D model to register a position of the overlay with respect to the physical control surface; and references one or more physical controls of the physical control surface.

In general, in a further aspect, system comprises: a memory for storing computer-readable instructions; and a processor connected to the memory, wherein the processor, when executing the computer-readable instructions, causes the system to perform a method of assisting an operator of a physical audio control surface, the method comprising: providing augmented reality (AR) glasses for the operator, wherein the AR glasses are in data communication with the physical audio control surface via an AR control system; providing a 3D model of the physical audio control surface, wherein the 3D model is stored in persistent storage of at least one of the physical audio control surface, the AR control system, and the AR glasses; enabling the operator to use physical controls of the physical audio control surface to mix a plurality of audio channels of a media project; and displaying on the AR glasses an overlay, wherein the overlay: is generated by at least one of the AR control system and the AR glasses using the 3D model to register a position of the overlay with respect to the physical control surface; and references one or more physical controls of the physical control surface.

DETAILED DESCRIPTION

We describe herein the use of a combination of augmented reality (AR) and physical control surfaces to improve the control surface user experience and effectiveness. In the examples of use cases described, an operator uses the control surface to control an audio editing and mixing application, which is generally implemented as a digital audio workstation (DAW). An example of a DAW is Pro Tools®, a product of Avid Technology, Inc., of Burlington, Massachusetts. However, the methods may be used with a control surface used in conjunction with any media processing application, including non-linear video editing applications, color correction applications, special effects software, CGI and graphics software. An example of a large control surface is the Avid S6™, also a product of Avid Technology, Inc.

Figure 1:
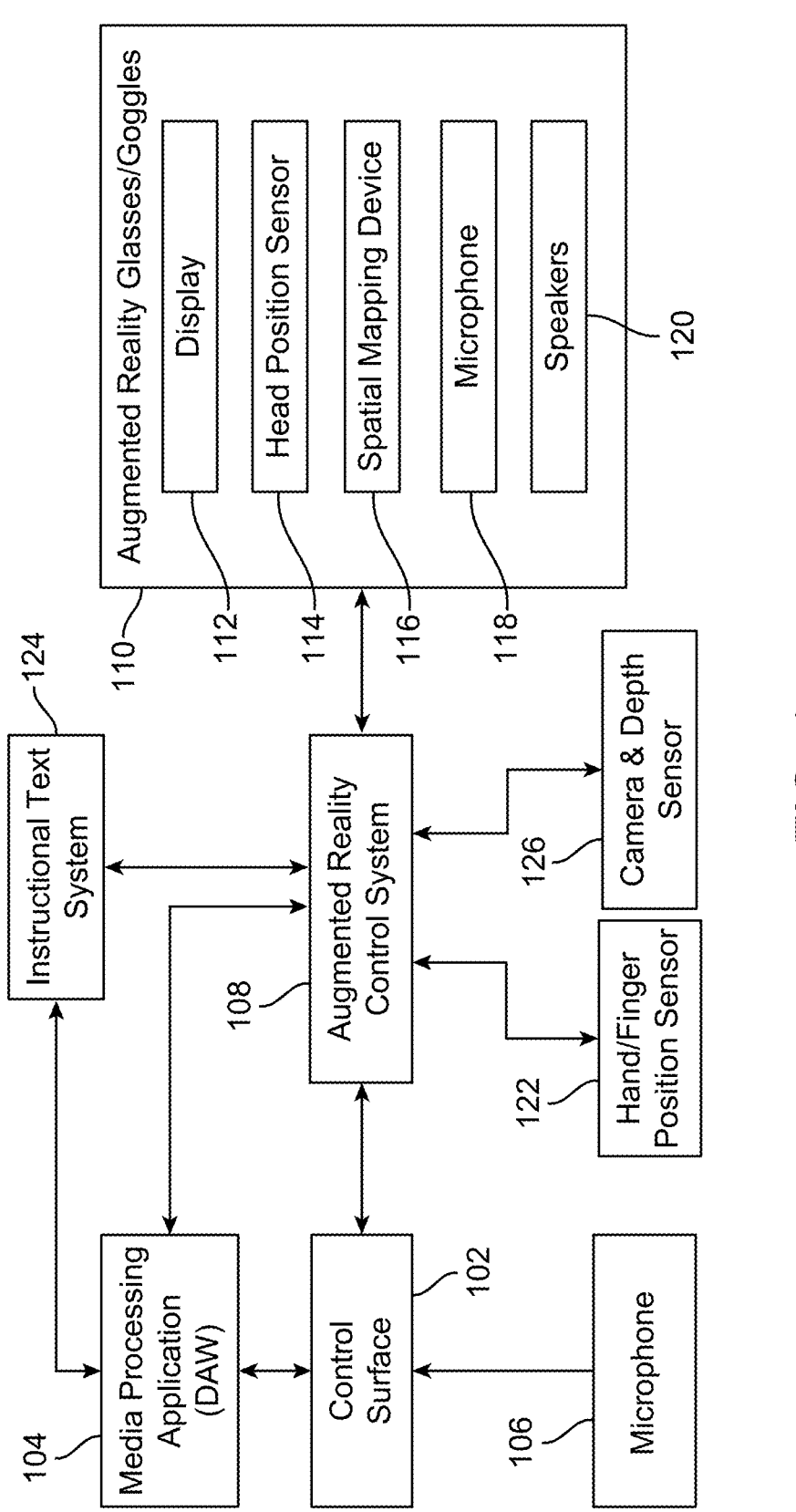
FIG. 1 is a high-level block diagram of the components of an augmented-reality-assisted audio mixing system.

In augmented reality systems, the operator wears AR smart glasses or goggles such as the Microsoft® HoloLens®, Apple Vision Pro™, or Meta Quest™ 3. Herein, we refer collectively to any smart glasses, goggles, or other AR devices worn by an audio mix engineer as AR glasses. The engineer is able to see the real world through the glasses, while computer-generated graphics and text are superimposed over the real world. FIG. 1 illustrates a system for providing a user interface with AR for a control surface operator. Control surface 102 is used to control media processing application (DAW) 104. The control surface may include microphone 106 for receiving voice commands. In the system architecture shown in FIG. 1, control surface 102 controls an external media processing application, which is where the actual media processing (e.g., audio mixing) is actually performed. In other architectures, the media processing is performed within the control surface itself, in which case the control surface may commonly be referred to as an audio mixing console and a separate media processing application may not be involved. For clarity, we use the term "control surface" herein to indicate that the methods may be used with either architecture. In addition, as used herein, "control surface" may refer to a device that is used to edit aspects of a media composition other than audio, when the term may refer to systems such as video switchers, video color-correction panels, industrial control panels, and consumer electronics. Non-audio aspects that may be edited using a control surface include video, graphics, and special effects. For example, a slider may be used to control a video fade, knobs may control color saturation, and switches could be used to choose among a selection of video inputs. In certain editing workflows, the control surface may be used to edit various aspects of a media composition that do not involve audio mixing.

The control surface is in data communication with AR control system 108 that hosts AR software. In various implementations, AR controller 108 is a module within control surface 102 or a part of media processing application 104. In other implementations, AR control system 108 is physically embedded within the AR glasses or distributed between the AR glasses and an application hosted on another system. In some applications, such as in live performance mixing, no media processing application is used. The audio engineer wears AR glasses 110, which includes display 112 and head position sensor 114 that transmits the location of the wearer's head and thus tracks head translations and rotations. The tracked head movements may result from movements of the head of an otherwise stationary wearer, and/or movements resulting from the wearer moving around the space, e.g., a dub stage, mix studio, or performance venue. The AR glasses may also include spatial mapping device 116 which maps the space in which the audio engineer and the mixing console are located and generates a three-dimensional map of the room's walls and the objects within the room. Any method of mapping a space and the objects within it may be used, including those that use one or more of visible light, infrared, and sonar sensors or devices. In addition, the AR glasses may be provisioned with microphone 118 that may receive voice commands from the operator and speakers 120. The user's movement of hands and fingers may be measured by hand/finger position sensor 122, which may be implemented as one or more sensors attached to a hand-held controller or a glove. In other implementations, the hand and finger movements may be tracked using the same sensors (e.g., optical or infrared) used by the spatial mapping device of the AR glasses, or hand/finger position sensor 122 may be built into the AR glasses 110. Gestures may be detected using image recognition techniques. Other sensors may be deployed to detect movement of other parts of the user's body, such as arms. The output of the 3D position sensor, hand/finger sensor, and any other position or movement sensors is transmitted to control system 108. The control system in turn interprets the received user position information to update a display on the AR glasses. Specific movements of the hands, fingers, and in some cases also the arm, may be interpreted as gestures for manipulating virtual objects appearing in the AR glasses display, or for performing other mixing functions. Gestures or movements that control parameters or constitute other mixing commands are forwarded by AR control system 108 to control surface 102, and, if present, to media processing application 104.

In the AR applications described herein, an overlay is projected onto the control surface, such that to an operator wearing the AR glasses the overlay text or graphics looks as if it is part of the control surface, such as a virtual silk-screen on the control surface panel. In other applications, the AR text or graphics floats above or adjacent to the surface. In one family of applications, the overlay is used to label the controls with the audio mixing function they currently perform.

The audio mixing function assigned to a control may change dynamically with the media editing context, which may be a particular operation being performed on the media composition or a phase of a multi-phase audio mixing workflow. The context may arise either in the media processing application (DAW) or in the control surface. Examples of an AR silk-screen that obtain their context from the DAW include but are not limited to: labelling of track names; the pan position; labels for the control surface switches, such as "Mute;" any of hundreds of parameters associated with an audio track, such as EQ and dynamics parameters; and plug-in parameters. Further examples of AR overlays dependent on the DAW context are any of the hundreds of parameters on a mixing console that are not track related, such as monitor section settings (e.g., control room volume and dim state), soft key labels, and general purpose input and output switches. When the context arises from the DAW, the data that determines the overlays (i.e., the content of the overlays and the specific controls to which they apply) is sent from the DAW to control surface, which in turn sends the information on to the AR control system. In other cases, the DAW communicates the context directly to the AR control system. In certain implementations, the overlay is rendered in the AR control system and is sent to the AR glasses where it is displayed. In other implementations, the data is sent from the AR control system to the AR glasses to be rendered by the AR glasses.

Examples of AR overlays that obtain their context from the control surface include: track paging keys, which, for a 16 channel mixer, may cause tracks 1-16 to be shown on the virtual silk-screen, or if the user presses a page-right key on the control surface, cause tracks 17-32 to be shown; parameter paging keys, such as the choice as to which page of EQ, dynamics, or plug-in parameters are shown on the virtual silk-screen for an array of physical knobs; switch-paging keys; and the choice as to which page of functions are shown on the virtual silk-screen to label switches, such as labeling a 4×8 grid of switches to show a particular set of functions. Further examples of overlays that are dependent on the control surface context include paging keys for additional controls, such as a joystick; modifier keys such as shift, alt, option, and control keys, which may change the assigned function of any switch, fader, knob, joystick, or other control when pressed. The virtual silk-screen is updated to label these different functions in accordance with the console context. In general, any control of any type can be re-labeled on the virtual silkscreen to show its current functionality.

Figure 2:
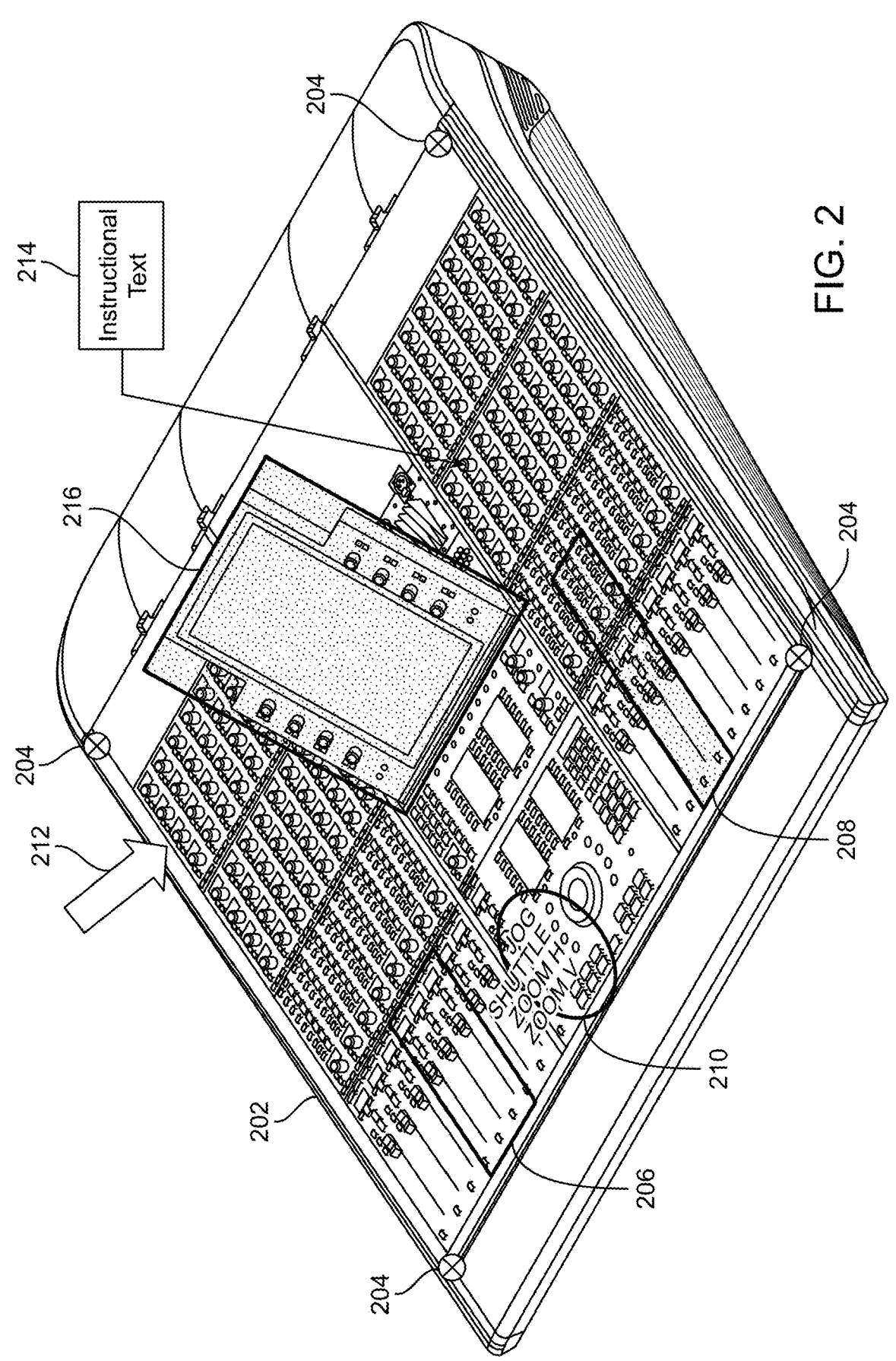
FIG. 2 is a diagram of a control surface illustrating some augmented reality virtual enhancements to a control surface.

FIG. 2 illustrates some of the virtual enhancements to a control surface that may be provided via AR. Physical control surface 202 includes numerous physical controls, such as rotatable knobs, buttons, and faders. In order to help register the AR system with the exact position of the control surface, physical (built-in) fiducial markers 204 may be placed on the control surface. Various kinds of AR graphics may be used to draw the operator's attention to certain controls when they are relevant to the task at hand. For example, rectangular border 206 may be overlayed onto a set of channel strips. Alternatively, one or more controls may be highlighted by shading 208 that overlays a region of the control surface to add emphasis to those controls. In another application, dynamic text legends 210 may virtually label certain controls. This virtual silk-screening marking of the control surface may appear on knobs, faders, and switches. The label changes dynamically depending on the current function assigned to the control. For example, the virtual labels may indicate banking of a set of controls, a changed function of a set of knobs, or the parameters used to set equalization (EQ), dynamics (Dyn), reverb, or custom controls provided by a software plug-in module for the media processing application.

Other context-specific virtual graphics may include hovering pointers, such as arrow 212 or instructional text 214 that floats away from the control surface and pertains to one or more controls indicated, for example, by an arrow. An arrow overlay may appear, for example, in response to a verbal request such as "Show me the gain controls for drums" or instructional text may appear in response to a user query such as: "Show me the controls that will add brightness to the lead vocal track" or "Show me how to scroll to a new set of tracks on the control surface." In certain use cases, when displaying instructional text, audio instructions may play through speakers 120, with the audio corresponding to the displayed text or complementing the text with supporting audio, for example illustrating an audio effect generated by the use of a control referenced in the displayed instructions.

In various implementations, the AR control surface includes a talkback microphone function. In a live recording context, the artist and sound engineer are typically in separate spaces in a recording studio and use the talkback mic to communicate. While in some studios they are able to see each other through a window, in others they cannot see each other. To enhance communication in such situations, the AR system enables video conferencing while mixing so that the control surface operator sees a video projection of the artist on the AR glasses. The video conferencing may be used in conjunction with the talkback function, with the video displayed within the DAW window or in a pop-out window from the DAW. In either case, it is projected above the control surface as part of the DAW user interface.

The position of the control surface with respect to the operator may be determined using object recognition techniques, such as those that use cameras, infrared, and lidar. Fiducial markers may be used to aid object position mapping since their relative positions are fixed and known to the system. Such fiducial markers, e.g., those illustrated in FIG. 2, 204, provide information to the AR control system as to the relative position and orientation of the operator's viewpoint and the control surface. Fiducial markers may be fixed geometric shapes or patterns on the control surface. In general, three or more fiducials are used, but a single shape may suffice, particularly when placed perpendicular to the control surface. In low light environments, infrared emitters or low intensity visible light may be used to illuminate the fiducials.

One use case involves the use of AR overlays for training. For example, a new user may be introduced to the various of controls of the control surface, one group at a time, with each group highlighted in turn and annotated with instructional text, graphics, or audio to explain the role of the group of controls and illustrate their effects on an audio composition. A novice user may be shown how various common audio mixing workflows proceed by means of a programmed sequence of AR overlays, graphics, and text which highlight the operative controls, optionally inviting the user to experiment with the controls. Instructional text may be received by the AR control system from a DAW that has instructional text built into it, or it may be received from a separate instructional text application. An instructional text application may be hosted on separate system 124 (FIG. 1) or may be implemented as a software module on the same system hosting the DAW.

AR overlays may be useful for providing a user with help, either without prompting or in response to a verbal prompt. For example, a user may use a verbal command to be shown which controls are assigned to the percussion tracks, and the AR system responds by drawing the user's attention to the appropriate set of controls using one or more of the highlighting techniques mentioned above.

Another application of AR in audio mixing is to help direct the operator's attention to an attentioned track, which involves expanding the editing controls on the surface for that track. A user may use a gesture to attention a track. The gesture (e.g., hand and finger position) is tracked by the AR control system and communicated to the control surface, which then sends instructions and data to the AR control system to generate an overlay such as a border or shaded but largely transparent floating overlay 216 (FIG. 2), or a virtual silk-screen rendering, highlighting the attentioned track. In the example illustrated in FIG. 2, the attentioned track together with expanded controls for the track are mapped to a raised monitor of the control surface and its sidecar controls.

The AR glasses may display assets that are part of the media project in hand, such as audio clips. These may be displayed adjacent to the control surface or in the periphery of the field of view, and the operator may drag the asset into a digital audio workstation session using gestures or voice commands.

In order to provide a convincing illusion that AR graphics forms a part of the control surface, the overlays need to be precisely registered with the physical control surface and, from certain user viewpoints, appropriately occluded by the physical controls and certain other parts of the control surface. In particular, controls that may occlude the virtual text and graphics include fader caps, knobs, switches, joysticks, and other controls having relief. Other parts of the control surface that may occlude the virtual silk-screen include modules that protrude from or are otherwise situated above the plane of the control surface, such as a raised monitor. In order to accommodate this need, the AR control system stores a high-precision 3D model of the control surface in persistent memory of the system hosting the AR control system. An operator is able to install updates to existing models or add completely new models as new control surfaces are introduced. In certain other implementations, the 3D model of the control surface is stored in the control surface itself, from which it may be retrieved by the AR control system. This has the advantage that the operator does not need to install new augmented realty control system software or updates to work with a new control surface. In other implementations, the 3D model of the control surface is be stored within the AR glasses.

The 3D model, together with a high-precision determination of the fiducials from real-time imagery obtained by the AR Control System from camera and/or depth sensor 126, provide the information required by the AR system to compute the correct occlusion. The camera/depth sensor may be implemented as a stand-alone device or may be built into AR glasses 110. Object recognition may be performed with a LIDAR depth sensor, LIDAR with a single camera, two cameras, or other methods well known in the art. In implementations that use fiducials, at least one camera is required. The camera(s) and/or depth sensor may use object recognition algorithms to find and model the edges and other controls of the control surface. Since the use of a fader changes the position of the fader cap, the 3D model is dynamically updated, with the AR silk-screen being dynamically rendered in accordance with the current fader positions. The fader positions may be read electronically by the control surface to an accuracy of about 0.1 mm. For implementations in which the AR control system stores the known 3D models in persistent storage, the control surface sends the precise fader location to the AR control system, which uses the positions of the operator's head or eye position, faders, and control surface to render an occluded virtual silkscreen image to the AR glasses. In other implementations, it is the DAW that sends the precise fader location to the AR control system. Such implementations may be used when playing back automated fader moves when the user is not touching the fader, though a potential disadvantage may arise if the control surface positions the fader in a slightly different position than requested by the DAW as a result of inaccuracies in the control surface's motor servo system. This would result in some inaccuracy in the occlusion rendering. To obviate this issue, even when under DAW automation control, the control surface may send the fader position to the AR control system.

In various implementations, occlusion of the virtual overlay by the operator's hand is also taken into account by the AR control system. Data from camera/depth sensor 126 together with object recognition methods are used to model the extent and 3D position of the hand and determine the correct occlusion.

Figure 3:
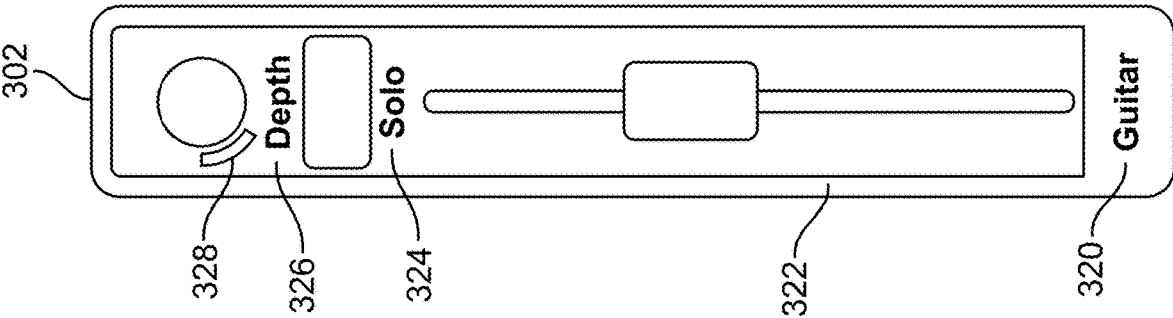
FIG. 3 illustrates a control strip of a control surface for which an augmented reality virtual silk-screen is dynamically updated.
Figure 3:
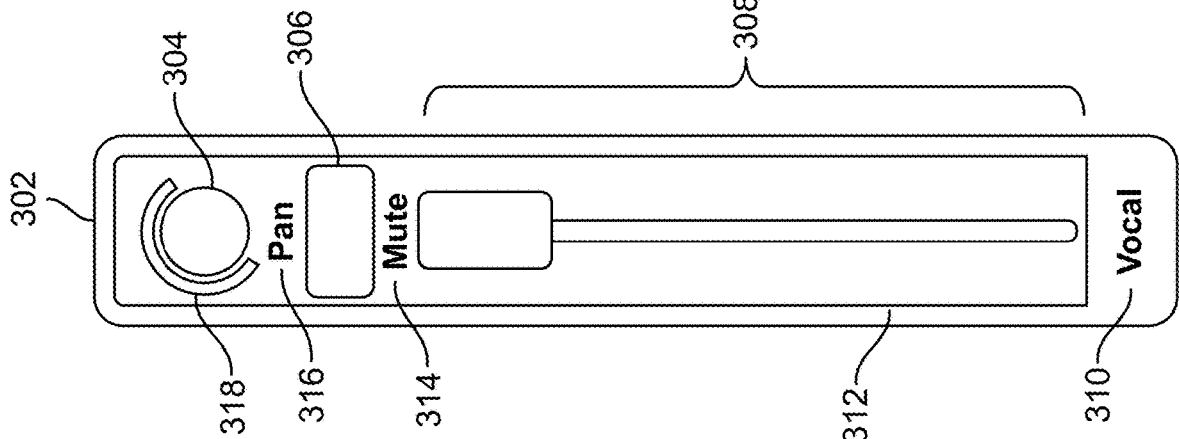

A dynamically changing virtual silk-screen of a control surface control is illustrated in FIG. 3. Physical channel strip 302 includes three physical controls: knob 304, switch/button 306, and fader 308. At left, the channel strip is assigned to a vocal channel and the AR control system overlays the following dynamic annotations onto the channel strip: channel strip label 310 ("Vocal"), channel strip boundary 312 in a first color, switch label 314 ("Mute"), knob label 316 ("Pan"), and knob position indicator 318. At right, the same physical channel strip 302 is assigned to a guitar channel and the AR control system dynamically updates the overlays as follows: channel strip label 320 ("Guitar"), channel strip boundary 322 in a different color from that of boundary 312, switch label 324 ("Solo"), knob label 326 ("Depth"), and knob position indicator 328.

Figure 4:
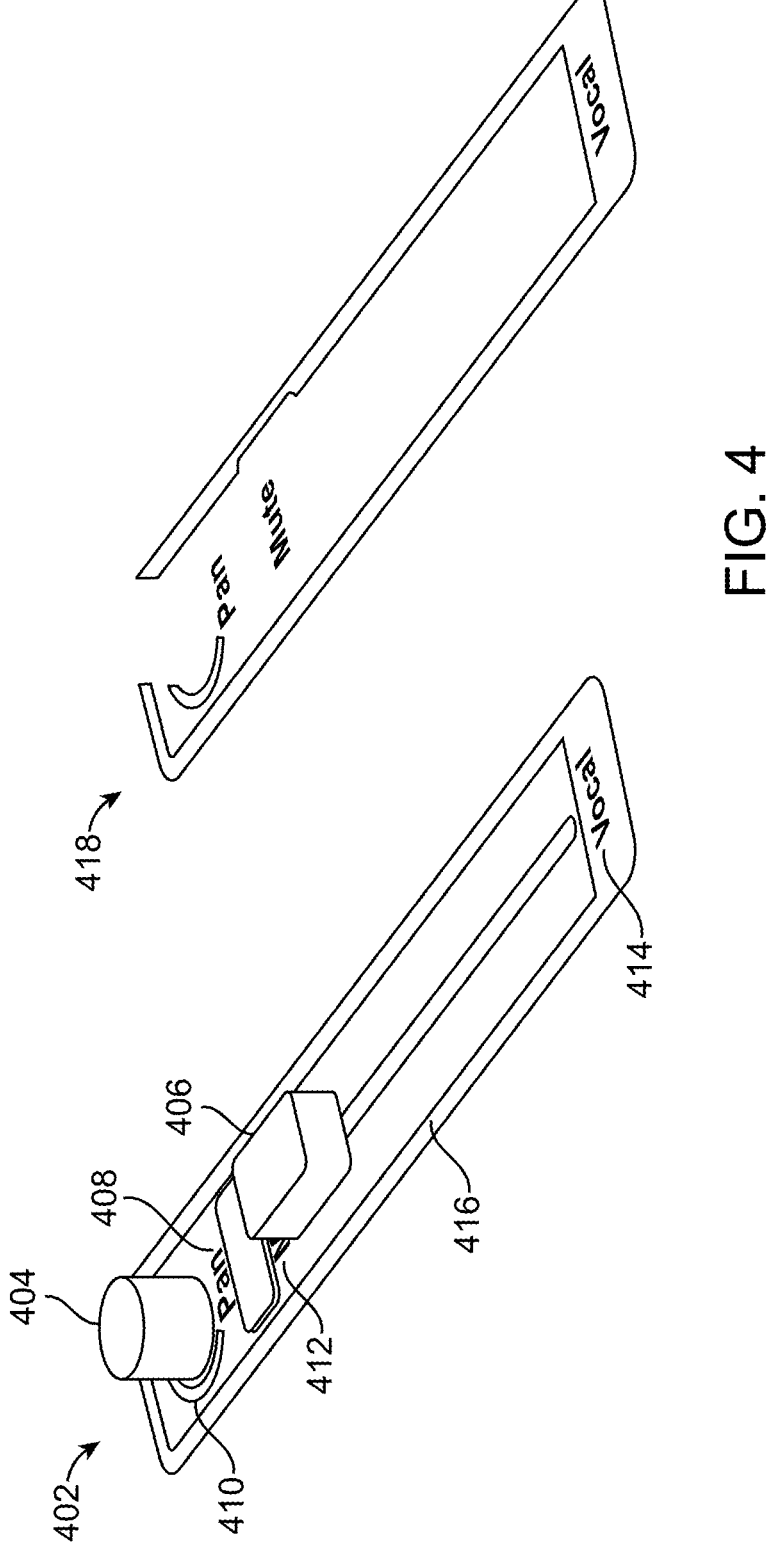
FIG. 4 illustrates dynamic updating of occlusion of the virtual silk-screen of the control strip illustrated in FIG. 3.

FIG. 4 illustrates virtual occlusion for the AR-generated silk screening. At left, physical channel strip 402, such as that displayed in plain view in FIG. 3, is viewed obliquely by the control surface operator. Knob 404 and fader cap 406 protrude from the surface. Virtual silkscreen knob label 408 ("Pan"), knob position indicator 410, switch label 412 ("Mute"), channel strip label 414, and channel strip boundary 416 are drawn with the appropriate perspective. In addition, knob position indicator 410, is partially occluded by knob 404, and switch label 412 and channel strip boundary 416 are partially occluded by fader cap 406. At right, AR overlay graphics 418 are shown without the physical controls.

Various components of the control surfaces, AR controller, AR glasses, hand/finger position sensors, camera and depth sensors, instructional text system, and other systems described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, OLED displays, various stereoscopic displays including displays requiring viewer glasses and glasses-free displays, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen/stylus and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of assisting an operator of a physical audio control surface, the method comprising:

providing augmented reality (AR) glasses for the operator, wherein the AR glasses are in data communication with the physical audio control surface via an AR control system;

providing a 3D model of the physical audio control surface, wherein the 3D model is stored in persistent storage of at least one of the physical audio control surface, the AR control system, and the AR glasses;

enabling the operator to use physical controls of the physical audio control surface to mix a plurality of audio channels of a media project; and displaying on the AR glasses an overlay, wherein the overlay:

is generated by at least one of the AR control system and the AR glasses using the 3D model to register a position of the overlay with respect to the physical control surface; and references one or more physical controls of the physical control surface.

2. The method of claim 1, wherein the overlay appears to be located on a surface of the physical audio control surface.

3. The method of claim 2, wherein at least part of the overlay appears to be printed onto the surface of the physical audio control surface.

4. The method of claim 1, wherein at least part of the overlay appears to float above a surface of the physical audio control surface.

5. The method of claim 1, wherein the overlay corresponds to functions assigned to the physical controls of the physical audio control surface, the functions being determined by a current phase of an audio mixing workflow of the media project.

6. The method of claim 1, wherein the overlay includes instructional text that pertains to one or more of the referenced one or more physical controls of the AR control surface.

7. The method of claim 1, wherein the overlay is dynamically updated based at least in part on a position of the AR glasses with respect to the physical audio control surface.

8. The method of claim 1, wherein the overlay is updated in real time to reflect an adjustment of a position of the referenced one or more physical controls.

9. The method of claim 1, wherein the overlay is updated in real time to simulate occlusion of a portion of the overlay by one or more physical components of the physical audio control surface.

10. The method of claim 9, wherein the physical component is a protruding knob and the occluded portion of the overlay includes a position indicator of the knob.

11. The method of claim 9, wherein the physical component is a fader cap and the occluded portion of the overlay includes a switch label.

12. The method of 9, wherein the physical component is a display of the physical audio control surface.

13. The method of claim 1, wherein the overlay is adjusted in real time to simulate occlusion of a portion of the overlay by a hand of the operator.

14. The method of claim 1, further comprising:

providing at least one of a hand and finger position sensor;

using the at least one of the hand and finger position sensor to detect a gesture made by the operator; and wherein the AR overlay is determined in part by the gesture made by the operator.

15. The method of claim 1, wherein the overlay is generated in response to a prompt by the operator.

16. The method of claim 1, wherein the overlay is generated in response to operation of a control of the physical audio control surface.

17. The method of claim 1, wherein the overlay is determined in part by a current editing context of the media project.

18. The method of claim 17, wherein the editing context is determined by a media processing application controlled by the physical audio control surface.

19. The method of claim 17, wherein the editing context is determined by the physical audio control surface.

20. The method of claim 17, wherein the editing context corresponds to a phase of a multi-phase audio mixing workflow for the media project.

21. A computer program product comprising:

a non-transitory computer-readable medium with computer-readable instructions encoded thereon, wherein the computer-readable instructions, when processed by a processing device instruct the processing device to perform a method of assisting an operator of a physical audio control surface, the method comprising:

providing augmented reality (AR) glasses for the operator, wherein the AR glasses are in data communication with the physical audio control surface via an AR control system;

providing a 3D model of the physical audio control surface, wherein the 3D model is stored in persistent storage of at least one of the physical audio control surface, the AR control system, and the AR glasses;

enabling the operator to use physical controls of the physical audio control surface to mix a plurality of audio channels of a media project; and displaying on the AR glasses an overlay, wherein the overlay:

is generated by at least one of the AR control system and the AR glasses using the 3D model to register a position of the overlay with respect to the physical control surface; and references one or more physical controls of the physical control surface.

22. A system comprising:

a memory for storing computer-readable instructions; and a processor connected to the memory, wherein the processor, when executing the computer-readable instructions, causes the system to perform a method of assisting an operator of a physical audio control surface, the method comprising:

providing augmented reality (AR) glasses for the operator, wherein the AR glasses are in data communication with the physical audio control surface via an AR control system;

providing a 3D model of the physical audio control surface, wherein the 3D model is stored in persistent storage of at least one of the physical audio control surface, the AR control system, and the AR glasses;

enabling the operator to use physical controls of the physical audio control surface to mix a plurality of audio channels of a media project; and displaying on the AR glasses an overlay, wherein the overlay:

is generated by at least one of the AR control system and the AR glasses using the 3D model to register a position of the overlay with respect to the physical control surface; and references one or more physical controls of the physical control surface.

* * * * *